United States Patent [19]

McCort

[11] 4,226,662
[45] Oct. 7, 1980

[54] APPARATUS FOR TREATING FIBROUS BOARDS

[75] Inventor: Ralph E. McCort, Newark, Ohio

[73] Assignee: Owens-Corning Fiberglas Corporation, Toledo, Ohio

[21] Appl. No.: 974,165

[22] Filed: Dec. 28, 1978

[51] Int. Cl.² ............... B32B 31/00; B05G 11/00; B05D 5/00
[52] U.S. Cl. .................... 156/390; 118/37; 118/412; 156/510; 427/284
[58] Field of Search ............ 427/284, 285, 290, 291, 427/292; 118/37, 35, 410, 411, 412; 156/324, 390, 554, 555, 510

[56] References Cited

U.S. PATENT DOCUMENTS

| | | | |
|---|---|---|---|
| 2,694,648 | 11/1954 | Muench | 427/285 |
| 2,702,761 | 2/1955 | Mannheim | 427/284 |
| 2,745,129 | 5/1956 | Johnson | 118/410 |
| 3,081,213 | 3/1963 | Chinn | 118/411 |
| 3,595,203 | 7/1971 | Fabulich | 118/410 |
| 3,967,581 | 7/1976 | Zirbel | 118/410 |
| 3,994,765 | 11/1976 | Brinkmann | 156/324 |

Primary Examiner—Douglas J. Drummond
Attorney, Agent, or Firm—Ronald C. Hudgens; Philip R. Cloutier; Ted C. Gillespie

[57] ABSTRACT

In a method and apparatus for treating a fibrous board, a portion of an edge of the board is cut away, a liquid adhesive is applied to the remaining edge portion, and the liquid is dried to bind the fibers of the remaining edge portion.

4 Claims, 6 Drawing Figures

APPARATUS FOR TREATING FIBROUS BOARDS

This invention relates to the treating of fibrous boards in which the edges of the fibrous boards are routed to form a kerfed edge.

In one of its more specific aspects, the invention relates to the manufacture of shiplap edges for ductboard materials of mineral fibers, and particularly of glass fibers. The invention can also be usefully applied to boards of all fibrous materials.

A problem in the fiberboard industry is that of damage to the fiberboard products during the various stages of packaging, shipping and installing. This problem is of particular concern when the edges of the fiberboard are either molded or routed to form a kerfed shiplap edge, the kerfed edge being useful to permit the connection of successive fiberboard pieces in the field. The damage to the kerfed shiplap edges often includes the splitting or delamination of the layers of fibers in the male shiplap end, thereby preventing its insertion into the female end in the field.

A proposed solution to the problem is the molding of the shiplap edges without the routing of any edge material, thereby creating a region of heavier density fibrous material in the vicinity of the kerfed edge to prevent damage to the kerfed edge. This process is unsatisfactory, however, because molded shiplap edges fail to provide the truly square corners produced by routing, and delamination of the male shiplap edge can still occur.

There has now been developed a shiplap method and apparatus in which a portion of the edge of a fibrous board is cut away, a liquid adhesive is applied to the remaining edge portion, which is the male end of the shiplap, and the liquid adhesive is allowed to dry. The application of the adhesive material strengthens, enriches and binds together the fibers in the remaining edge portion of the shiplap edges, thereby making the edges more resistant to abuse. Shiplap edges manufactured according to this invention are more adapted to be utilized in the field even when damaged or bent because the adhesive material substantially prevents delamination.

According to this invention there is provided a method for treating a fibrous board in which a portion of an edge of the board is cut away, a liquid adhesive is applied to the remaining edge portion, and the liquid adhesive is dryed. The board can be passed through an applicator station to apply the liquid adhesive. A facing can be applied to the board. The liquid adhesive can be applied to the top, side and bottom of the remaining edge portion. The liquid adhesive can be supplied to the applicator station at a constant pressure, or can be otherwise controlled.

Also, according to this invention, there is provided apparatus for treating fibrous boards comprising means for cutting away a portion of an edge of the board, and means for applying a liquid adhesive to the remaining edge portion. There can also be provided means for drying the liquid adhesive and means for attaching a facing to the board. The means for applying can be adapted to apply the liquid adhesive to the top, side and bottom of the remaining edge portion. The means for applying can be adapted to supply the liquid adhesive at constant pressure, or can be adapted to otherwise control the flow of liquid adhesive.

Figure 1:
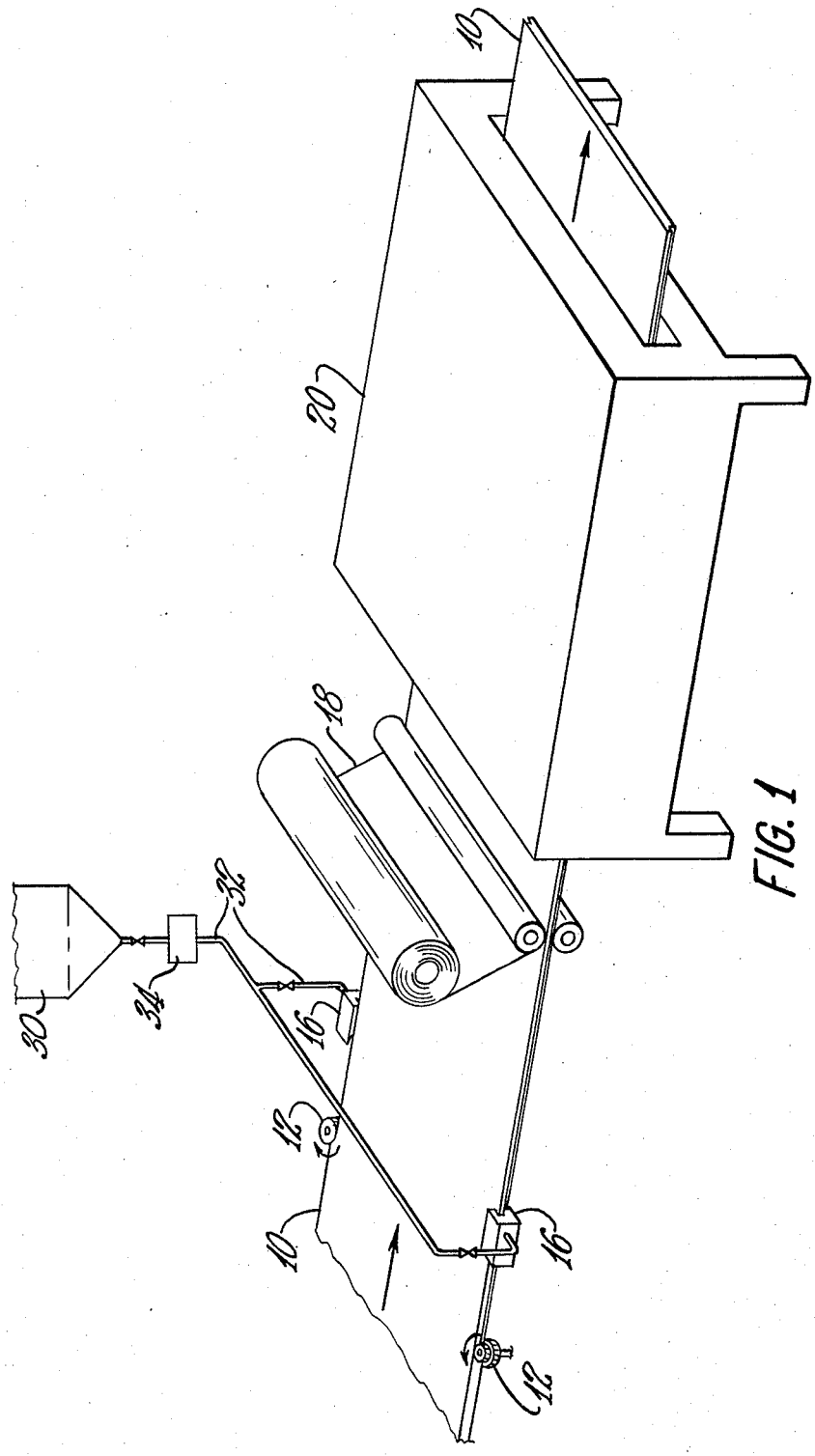
FIG. 1 is a schematic isometric view of the apparatus for treating a fibrous board according to the invention.

Referring to FIG. 1, there is shown fibrous board 10 traveling (via means not shown) in the direction indicated by the arrow. Means 12 for cutting away a portion of the edge can be of any conventional type and can be positioned at the edges of the board. The cutting away of a portion of the edge of the board leaves remaining edge portion 14, as shown in FIGS. 3 through 6. Subsequent to the cutting away of a portion of the edge, the fibrous board passes applicators 16 which apply a liquid adhesive to the remaining edge portion.

Subsequently, a facing such as foil facing 18 can be applied to the fibrous board. The facing and the remaining edge portion form the female end portion of the fibrous board. An adhesive can be applied to the fibrous board, by means not shown, to securely attach the facing to the fibrous board. In order to dry the liquid adhesive on the remaining edge portion of the fibrous board, the fibrous board can be passed through oven 20.

Figure 2:
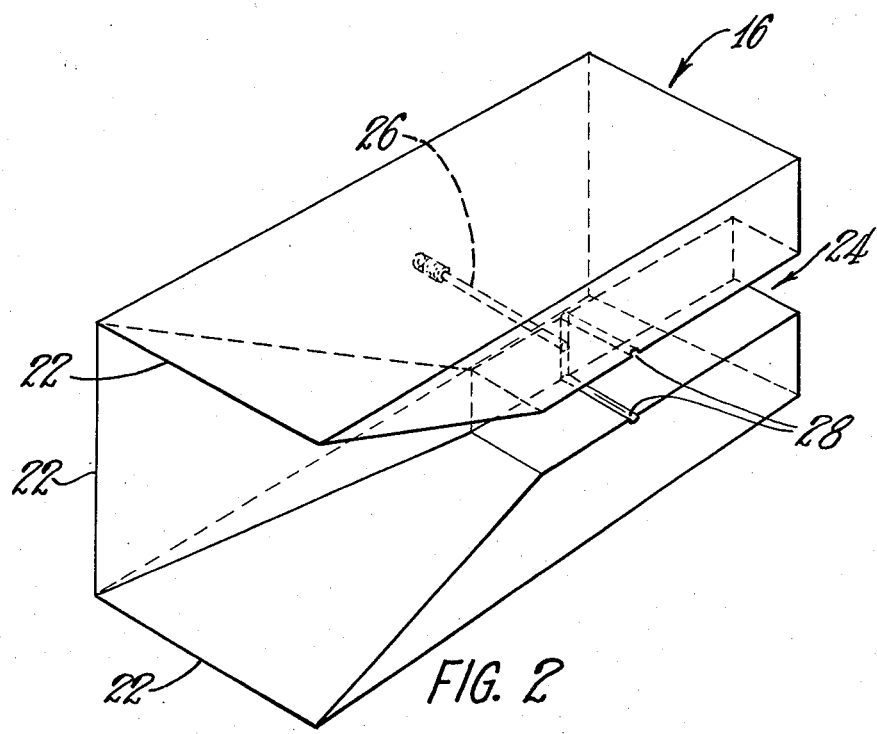
FIG. 2 illustrates an applicator for applying a liquid adhesive to the fibrous board according to the principles of the invention.

The applicator member can be supplied by a supply system, as will hereinafter be described. As shown in FIG. 2 the applicator member can be generally block-shaped with beveled inlet surfaces 22 which narrow down to channel 24. The channel is of a size sufficient to accommodate the remaining edge portion of the fibrous board as the board passes the applicator member. The applicator member can be adapted with supply conduit 26 to introduce the liquid adhesive into the channel. The channel can also have branch conduits, or troughs, 28 adapted to spread the liquid adhesive to all sides of the channel and thereby promote the application of the liquid adhesive to the top, side and bottom of the remaining edge portion of the fibrous broad.

Any suitable applicator storage and supply system will suffice. For example, the binder piping system can be comprised of storage tank 30 and feeder pipes 32. The liquid adhesive can be supplied at a constant pressure to the applicator station by maintaining (by means not shown) the liquid adhesive at a constant level in the storage tank, and utilizing gravity feed. Alternatively, pump and meter 34 can be positioned in the piping system for a controlled flow of the liquid adhesive to the applicators.

In the preferred embodiment, the liquid adhesive utilized is a vinyl acetate ethylene latex such as adhesive C-6052, currently supplied by H. B. Fuller, with C-31 hydrated alumina (12.5% by weight), supplied by Alcoa, as a filler.

Figure 3:
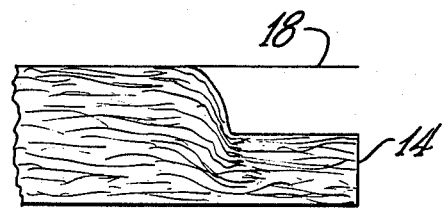
FIG. 3 illustrates a fibrous board of the prior art having a molded shiplap edge.
Figure 4:
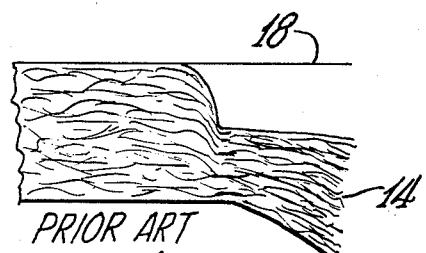
FIG. 4 illustrates a fibrous board of the prior art having a molded shiplap edge which has been damaged.
Figure 5:
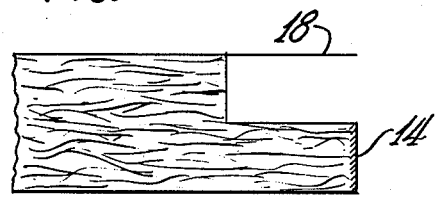
FIG. 5 illustrates a cross sectional view of a fibrous board which has been routed and to which a liquid adhesive has been applied according to the principles of the invention.
Figure 6:
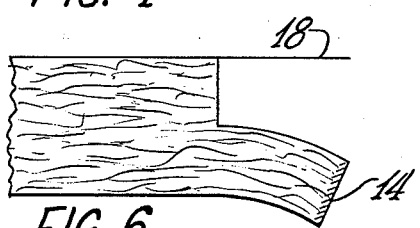
FIG. 6 illustrates the fibrous board of FIG. 4 in a damaged condition.

Referring to FIGS. 3 and 4, it can be seen that the unreinforced remaining edge portion of a kerfed fibrous board of the prior art can become delaminated when subjected to abuse. It can also be seen that the delaminated remaining edge portion of the prior art board in FIG. 4 could be inserted into the corresponding female edge of a fibrous board only with considerable difficulty. By way of contrast, the fibrous boards shown in FIGS. 5 and 6 have been treated according to the principles of this invention and illustrate that even when damaged, the remaining edge portion can still be inserted into the female edge of a fibrous board because the application of the liquid adhesive has prevented delamination of the fibers. It is to be understood that the portion of the edge of the board that is cut away, although shown in the drawings as rectangular in cross-sectional configuration, can be of other shapes and sizes.

Various modifications of the above described embodiments of the invention would be apparent to those skilled in the art and it is to be understood that such modifications can be made without departing from the scope of the invention.

I claim:

1. Apparatus for treating a fibrous board comprising:
   a. means for cutting away a portion of an edge of the board to form a remaining edge portion on the board;
   b. means for applying a facing to said board; and,
   c. means for applying a liquid adhesive to the top, side and bottom of said remaining edge portion, said means for applying, comprising a generally block-shaped member having a channel positioned therein for the passage of said remaining edge portion therethrough, said channel having beveled inlet surfaces, a conduit for supplying said liquid adhesive into said channel, and trough-shaped branch conduits adapted to spread said liquid adhesive to all sides of said channel, said branch conduits being positioned in the side, top and bottom, respectively, of said channel.

2. The apparatus of claim 1 comprising means for controlling the flow of said liquid adhesive to said means for applying.

3. The apparatus of claim 2 comprising means for supplying said liquid adhesive at constant pressure to said means for applying.

4. The apparatus of claim 3 comprising means for drying said liquid adhesive.

* * * * *